United States Patent
Hartmann et al.

[11] Patent Number: 5,388,896
[45] Date of Patent: Feb. 14, 1995

[54] METHOD FOR BRAKING MOTOR VEHICLE WHEELS WHILE REDUCING A YAWING MOMENT OF AN ANTILOCK BRAKING SYSTEM

[75] Inventors: Uwe Hartmann, Stuttgart; Friedrich Kost, Kornwestheim; Karl-Josef Weiss, Stuttgart; Wolf-Dieter Ruf, Waldstetten, all of Germany

[73] Assignee: Robert Bosch GmbH, Stuttgart, Germany

[21] Appl. No.: 92,300

[22] Filed: Jul. 15, 1993

[30] Foreign Application Priority Data

Aug. 6, 1992 [DE] Germany .............................. 4225983

[51] Int. Cl.$^6$ ................. B60T 8/32; B60T 8/24; B60T 8/68
[52] U.S. Cl. ..................................... 303/111; 303/100
[58] Field of Search ............. 303/100, 111, 113.5, 303/DIG. 3, DIG. 4, 9.62; 364/426.02

[56] References Cited

U.S. PATENT DOCUMENTS

| | | | |
|---|---|---|---|
| 3,988,043 | 10/1976 | Reinecke | 303/DIG. 4 |
| 4,545,240 | 10/1985 | Leiber | 303/DIG. 4 |

FOREIGN PATENT DOCUMENTS

| | | |
|---|---|---|
| 4030653.4 | 4/1992 | Germany . |
| 4030704.2 | 4/1992 | Germany . |
| 4030724.7 | 4/1992 | Germany . |

*Primary Examiner*—Matthew C. Graham
*Attorney, Agent, or Firm*—Kenyon & Kenyon

[57] ABSTRACT

In a method for braking motor vehicle wheels, to reduce a yawing moment produced by an antilock braking system, the build-up of braking pressure on at least one wheel is influenced. The braking pressure on the wheels of one axle is influenced to such an extent that the differential between the braking pressures of one axle does not exceed a maximum permissible value. This maximum permissible value is made dependent upon the vehicle speed and the transversal acceleration.

10 Claims, 1 Drawing Sheet

METHOD FOR BRAKING MOTOR VEHICLE WHEELS WHILE REDUCING A YAWING MOMENT OF AN ANTILOCK BRAKING SYSTEM

A METHOD FOR BRAKING MOTOR VEHICLE WHEELS WHILE REDUCING A YAWING MOMENT OF AN ANTILOCK BRAKING SYSTEM

FIELD OF THE INVENTION

The present invention relates to a method for braking motor vehicle wheels.

BACKGROUND INFORMATION

When a motor vehicle is braked at coefficients of (static) friction (adhesion coefficients) ($\mu$-split) which vary greatly from side to side., the braking forces, which differ in intensity between the Left and right sides of the motor vehicle, produce a yawing moment. This yawing moment seeks to turn the motor vehicle in the direction of the higher coefficient of friction. This can cause a considerable track offset (steering misalignment) and a dangerous change in direction, and can even cause the motor vehicle to skid when the rotational speed becomes so great that the driver does not have ample time to countersteer accordingly.

Conventional antilock control systems attempt to avoid these problems by correcting the brake pressure of the rear wheel having the higher coefficient of friction (high wheel) to match the regulated pressure of the rear wheel having the lower coefficient of friction (low wheel) (select-low automatic control). Since this results in more or less equal brake pressures and, thus, braking forces at both rear wheels, the yawing moment produced by the $\mu$-split is substantially reduced. However, since the potential braking force of the high rear wheel is not utilized nearly to the extent that is possible when there are large $\mu$-differentials, braking distances are lengthened considerably.

Since $\mu$-split can cause critical situations, above all when brakes are applied heavily, the rate-of-pressure-change gradient of the high front wheel is often limited (GMA representing the rate-of-change limitation for the yawing moment). However, this can have a negative effect when braking in a curve and, in addition, can lead to lengthening of the braking distance.

SUMMARY OF THE INVENTION

A method for braking motor vehicle wheels according to the present invention comprises the steps of:
  influencing a build-up of braking pressure on at least one of first and second wheels of an axle of the vehicle such that a pressure differential between the braking pressure on the first and second wheels does not exceed a preselected threshold pressure differential, in order to reduce a yawing moment produced by an antilock braking system; and
  increasing the preselected threshold pressure differential, as a function of time, from a beginning value, wherein the beginning value is valid at a start of a braking operation, decreases with rising vehicle speed, and increases with rising transversal acceleration.

When an antilock traction controller is used at known wheel-braking pressures (measured or estimated as described in German No. 40 30 704), the present invention makes it possible to largely circumvent the above-mentioned compromises, in conjunction with a superposed automatic control system for dynamic driving performance (as described in German No. 40 30 704), and to markedly shorten braking distances while simultaneously improving vehicle stability. The driver must also countersteer in this case, but not as fast and with less of an element of surprise, and also not as heavily at the beginning of the braking operation. The measure required for this comprises a differential pressure measuring limitation.

As a result, a better braking performance, as well as a shorter braking distance, is achieved at $\mu$-split (and, thus, driver reaction does not need to be as quick), and various vehicle types can be simply adapted to.

DETAILED DESCRIPTION

Figure 1:
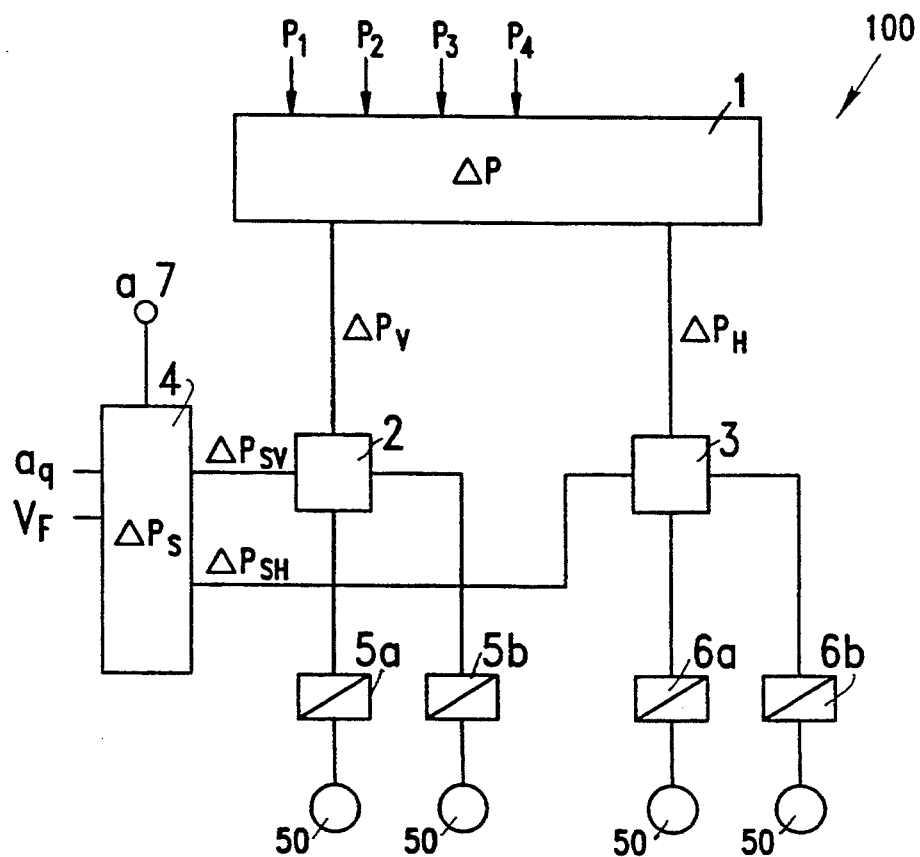
FIG. 1 shows a block diagram for illustrating the method according to the present invention.

The phase in which the brakes are applied is critical above all for vehicle stability in the case of $\mu$-split braking operations. The build-up of yawing moment must be slow enough to give the driver ample time to countersteer. The yawing moment is primarily produced by the pressure differentials and, consequently, the braking-force differentials existing between the left and the right wheels. Since the concept introduced here presupposes known and adjustable braking pressures (see, for example, German No. DE 40 30 724), the build-up of the yawing moment can be selectively influenced.

Starting from a beginning value when the brakes are applied, the permissible pressure differential is increased for both the front and rear wheels, dependent upon time. The permissible pressure differentials for braking and the rate-of-change gradients are made dependent upon the vehicle speed, upon the pressure at the low wheel (proportional to the low coefficient of friction), and upon the transversal acceleration of the vehicle. At a higher vehicle speed $v_F$, the pressure builds up more slowly at the high wheels, as it does in the same way given a low coefficient of friction. The permissible pressure differential at the front wheels can begin at a relatively large value and then rise rapidly; the permissible pressure differential of the rear wheels will generally begin at a smaller value (up to a select-low automatic control) and then rise more slowly.

If there is transversal acceleration $a_Q$, it can be assumed that different wheel loads produce pressure differentials between the wheels on the left and the right sides of the vehicle which do not have to be restricted. For this reason, the permissible pressure differentials are raised dependent upon the magnitude of the transversal acceleration.

The following example of a permissible pressure differential can apply. The starting value for the front axle when brakes are applied is as follows:

$$\Delta p_{str} K_0 + K_1/V_F + K_2 |a_Q|$$

where $K_0$ (for example, 20 bar), $K_1$ (for example, 50 bar m/sec.) and $K_2$ (for example, 5 bar sec$^2$/m) are constants. The profile of the permissible pressure differential during the braking action can be such that:

$$\Delta p_{Sv} = \Delta p_{St}v + K3 + K4/v_F$$

where K3 and K4 are constants (for example, K3=1 bar, and K4=15 bar m/sec.).

When the permissible pressure differential $\Delta p_{Sv}$ lies, by a specific value, above the actual pressure differential $\Delta p$, $\Delta p_{Sv}$ is not raised further, so that in case of a possible further increase in the $\mu$-differential, the differential-pressure limitation immediately becomes effective again.

The permissible pressure differential for the rear wheels ($\Delta p_{SH}$) is calculated in the same way, using different constants K0 through K4 (for example, K0=10 bar, K1=30 bar m/sec., K2=4 bar sec²/m, K3=0.2 bar, and K4=4 bar m/sec.).

As a result, the braking performance is improved, on the one hand, over standard antilock systems (automatic, individual front control, rear select-low), since the front is also not fully braked at the high wheel, and the braking distance is shortened, on the other hand, since all the wheels are fully braked after a certain time. Moreover, the applied additional information, such as $a_Q$ and $v_F$, and the freely selectable parameters K0 through K4 make it possible for the controller to be better adapted to different vehicles and driving conditions.

When a sudden, sharp pressure drop is determined on one front wheel during a controlled braking with a homogeneous coefficient of friction (more or less the same pressures to the left and right), it can be assumed that there has been a sudden, marked decrease in the coefficient of friction on the corresponding vehicle side. Since the corresponding rear wheel is also braked to this low coefficient of friction a short time later, and a considerable yawing moment is then generated, immediately after the pressure drop is detected, a very small, permissible pressure differential is specified for the rear wheels, which then again rises dependent upon time. Now, if the corresponding rear wheel likewise arrives at the lower $\mu$, and the antilock controller on this wheel lowers the braking pressure to keep the wheel-brake slippage to a small amount, then, in parallel to this and as a result of the now small, permissible pressure differential ($\Delta p_{SH}$), the pressure is also lowered on the other rear wheel, and no substantial, dangerous yawing moment can build up.

In one automatic control system for dynamic driving performance (as described, for example, in German No. DE 40 30 704), a setpoint value for the rate of yaw (rotational speed of the vehicle around the high axle) is calculated dependent upon the steering angle and other variables. Since the driver must countersteer in the case of $\mu$-split, the desired travel direction (e.g., straight ahead) does not conform with the specified steering angle, and the automatic control system for dynamic driving performance attempts to possibly change the travel direction, for example by intervening in the braking pressure.

To avoid this, as soon as $\mu$-split is recognized, an offset is determined for the setpoint rate of yaw. The setpoint value is then modified by this offset, to allow the desire for a change in travel direction to conform with the setpoint rate of yaw.

Given known tire forces (tire adhesion when braking), this offset can be calculated with the aid of a simple vehicle model (see German No. DE 40 30 704). It is simpler, as proposed in accordance with the present invention, when $\mu$-split is recognized, to take the filtered differential between the setpoint and actual rate of yaw as the offset, provided that this value varies within a range which is sensible from a physical standpoint. The wheel-braking pressures and the transversal acceleration of the vehicle are needed for the required $\mu$-split recognition. (To estimate these variables, in case they are not measured directly, see German No. DE 40 30 724 and German No. DE 40 30 653.) A comparison is initially made of the braking pressures on the left and right sides of the vehicle, either the sum of the pressures on the front and rear wheels, or only the pressures on the front wheels.

If there are considerable differences in pressure from one side of the vehicle to the other, it is either a question of a $\mu$-split braking or of a curve braking, and the pressure differences result from the different wheel loads because of the rolling motion of the vehicle. A comparison of the pressure differential and the transversal acceleration makes it possible to determine whether it is a question of a $\mu$-split braking.

For this purpose, for example, the quotient of the larger pressure (or the sum of the lateral pressure) can initially be formulated from the smaller pressure. This quotient x is then compared to the transversal acceleration $a_Q$, for example in accordance with the following equation:

$$x = P_{large}/P_{small}$$

$$f = \frac{x}{k\,|a_Q| + 1} - 1$$

$$0 < f < 1 \quad \text{limitation}$$

The variable f can thus be used as the indicator for the level of the $\mu$-differential or, given uncertain or disturbed input variables, for the probability of $\mu$-split.

FIG. 1 vehicle 100 with a block 1, which is fed with signals p1 through p4 corresponding to the wheel-braking pressures. This block 1 formulates the braking-pressure differentials $\Delta p_v = p1 - p2$ and $\Delta p_H = p3 - p4$ of the wheels of the two axles and feeds corresponding signals together with (plus or minus) signs to the comparators 2 and 3. Maximum permissible braking-pressure differentials, which are formulated in a block 4 with the help of the transversal-acceleration and vehicle-speed variables in accordance with the relations clarified above, are also fed to these comparators 2 and 3. If the absolute value of the differential value $\Delta p_v$ or $\Delta p_H$ exceeds the comparison value $\Delta p_{Sv}$ or $\Delta p_{SH}$, then, dependent upon the sign of $\Delta p_v$ or $\Delta p_H$, one of the valves 5a or 5b or 6a or 6b allocated to the wheels 50 is triggered to prevent a further build up of pressure on the corresponding wheel having the higher pressure.

Block 4 is informed by way of a terminal 7 when there is a sharp deceleration of a front wheel (i.e., when $-a$ becomes large). In such a case, the comparison value $\Delta p_{SH}$ for the rear axle is set to a small value.

Figure 2:
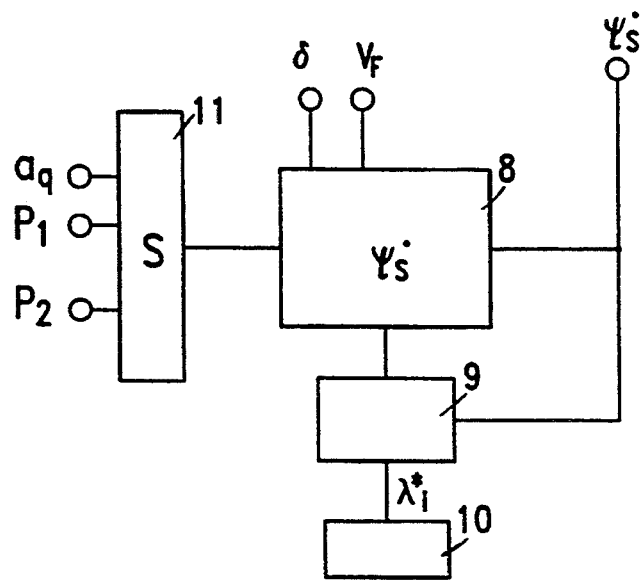
FIG. 2 illustrates a portion of a known controller for dynamic driving performance, which has been reconfigured in accordance with the present invention.

FIG. 2 illustrates a part of a known controller for dynamic driving performance, which has been reconfigured in accordance with the present invention. Here, the actual value of the rate of yaw $\Psi^\circ$ is compared in a comparator 9 to a maximum permissible rate of yaw $\Psi^\circ_s$, which is calculated in a block 8 (with the aid of the steering angle $\delta, v_F$). From the calculated deviation, threshold wheel-brake slippages $\lambda^*_i$ are determined at this point for the front wheels. A block 10 regulates the braking pressures along the lines of converging on the threshold braking-pressure values.

In accordance with the present invention, a signal is generated at this point in a block 11, when a μ-split-braking situation is recognized in block 11 with the aid of the measured or estimated values $a_q$, p1 and p2. This signal fed to block 8 causes the filtered differential $\Delta\Psi° = \Psi° - \Psi°_s$ to be superposed as an offset on the value of $\Psi°_s$:

Filtering (discrete-time, sampling point i), $$\Delta F_i = K_F \times \Delta F_{i-1} + (1 \Delta K_F) \times \Delta_i$$

Forget function, $$\Delta F_i = K_v \times \Delta F_i$$

where, for example, $$K_F = 0.9$$

$$K_v = 0.98$$

Setpoint value correction with offset, $$\Psi°_s = \Psi°_s \Delta F$$

What is claimed is:

1. A method for braking wheels of a vehicle, comprising the steps of:
    (a) setting a preselected threshold pressure differential to a beginning value for a start of a braking operation;
    (b) monitoring a speed of the vehicle;
    (c) monitoring a transversal acceleration of the vehicle;
    (d) controlling a build-up of braking pressure on at least one of a first and a second wheels of an axle of the vehicle such that a pressure differential between the braking pressure on the first and second wheels does not exceed the preselected threshold pressure differential, in order to reduce a yawing moment produced by an antilock braking system;
    (e) decreasing the preselected threshold pressure differential in response to an increase in the speed; and
    (f) increasing the preselected threshold pressure differential in response to an increase in the transversal acceleration.

2. The method according to claim 1, wherein the decreasing and increasing steps are repeated over time during the braking operation.

3. The method according to claim 1, wherein the controlling step is performed by a control circuit.

4. The method according to claim 1, wherein a gradient of the preselected threshold pressure differential is variable and becomes smaller with rising vehicle speed.

5. The method according to claim 1, wherein the buildup of braking pressure is controlled on wheels of both a front and a rear axle, a rear beginning value for the rear axle being smaller than a front beginning value for the front axle.

6. The method according to claim 5, wherein the antilock braking system has automatic individual-wheel control and is at the rear wheels.

7. The method according to claim 6, further comprising the steps of:
    determining at least one of a wheel deceleration and a pressure reduction for at least one of the front wheels; and
    setting the rear beginning value smaller than the front beginning value when the at least one of the wheel deceleration and the pressure reduction is determined.

8. The method according to claim 1, wherein an automatic control of dynamic driving performance calculates a maximum threshold rate of yaw, and controls an actual rate of yaw via the braking pressure as a function of the calculated maximum threshold rate of yaw.

9. The method according to claim 8, further comprising the steps of:
    recognizing a μ-split-braking situation;
    determining a filtered differential between the maximum threshold rate of yaw and the actual rate of yaw; and
    superposing the filtered differential as an offset to the maximum threshold rate of yaw after the μ-split-braking situation is recognized.

10. The method according to claim 9, wherein the recognizing step includes the steps of:
    formulating a quotient of a larger pressure on the axle to a smaller pressure on the axle; and
    comparing the quotient to the transversal acceleration.

* * * * *

UNITED STATES PATENT AND TRADEMARK OFFICE
CERTIFICATE OF CORRECTION

PATENT NO. : 5,388,896

DATED : February 14, 1995

INVENTOR(S) : Uwe Hartmann, etal.

It is certified that error appears in the above-indentified patent and that said Letters Patent is hereby corrected as shown below:

Column 1, lines 6-9, delete "A METHOD FOR BRAKING MOTOR VEHICLE WHEELS WHILE REDUCING A YAWING MOMENT OF AN ANTILOCK BRAKING SYSTEM";

Column 1, line 17, change ":he" to --the--;

Column 1, line 18, change "Left" to --left--;

Column 2, line 62, change "$\Delta P_{stv} K_0$" to --$\Delta P_{stv} = K_0$--;

Column 2, line 64, "K", to --$K_0$--;

Column 4, line 38, after "FIG. 1" insert --depicts a--;

Column 4, line 49, change "$\Delta p_v$" to -- $\nabla pv$--;

Column 4, line 50, change "$\Delta psv$" to --$\nabla^{o}_{sv}$--;

UNITED STATES PATENT AND TRADEMARK OFFICE
CERTIFICATE OF CORRECTION

PATENT NO. : 5,388,896

DATED : February 14, 1995

INVENTOR(S) : Uwe Hartmann, etal.

It is certified that error appears in the above-indentified patent and that said Letters Patent is hereby corrected as shown below:

Column 5, line 13, "$+(1_\Delta K_f)$" to -- $+(1-K_f)$ --;

Column 5, line 27, change "$\psi^\circ{}_s \Delta F$" to -- $\psi^\circ{}_s + \Delta F$ --;

Signed and Sealed this

Twenty-fifth Day of March, 1997

Attest:

BRUCE LEHMAN

Attesting Officer

Commissioner of Patents and Trademarks